United States Patent
Lee

(10) Patent No.: US 7,707,875 B2
(45) Date of Patent: May 4, 2010

(54) SOOT COLLECTION QUANTITY MEASURING DEVICE FOR DIESEL PARTICULATE FILTER

(75) Inventor: Kyung-Min Lee, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 798 days.

(21) Appl. No.: 11/646,079

(22) Filed: Dec. 26, 2006

(65) Prior Publication Data
US 2008/0028752 A1 Feb. 7, 2008

(30) Foreign Application Priority Data
Aug. 7, 2006 (KR) .................. 10-2006-0074248

(51) Int. Cl.
*G01M 15/10* (2006.01)
(52) U.S. Cl. .................................................. 73/114.71
(58) Field of Classification Search .............. 73/114.69, 73/114.71
See application file for complete search history.

(56) References Cited

U.S. PATENT DOCUMENTS 5,157,340 A * 10/1992 Walton et al. ............... 324/641
7,434,449 B2 * 10/2008 Kusaka et al. ............... 73/23.31
2006/0144124 A1 * 7/2006 Kusaka et al. ............... 73/23.33
2008/0264146 A1 * 10/2008 Roesch et al. ............... 73/23.33
2009/0126458 A1 * 5/2009 Fleischer et al. ............ 73/28.01

FOREIGN PATENT DOCUMENTS

JP 2003269134 9/2003
JP 2003301711 10/2003

* cited by examiner

Primary Examiner—Eric S McCall
(74) Attorney, Agent, or Firm—Morgan, Lewis & Bockius LLP

(57) ABSTRACT

The invention provides a soot collection quantity measuring device for a diesel particulate filter. The soot collection quantity measuring device for a diesel particulate filter includes: an anion charging unit that is provided in an exhaust pipe in front of a diesel particulate filter and has a plurality of conductor flat plates in parallel with one another, and a capacitor that is provided at the back of the anion charging unit and has upper and lower electrode plates connected to a direct-current high-voltage power supply. The soot particulates pass through the anion charging unit which is negatively charged, and the charged soot particulates are collected in the upper electrode plate by an electric field between the upper and lower electrode plate.

4 Claims, 2 Drawing Sheets though the average value of the soot collection quantity in diesel particulate filter 10 is less than a predetermined amount, soot collection quantities of some portions may exceed the predetermined amount or ashes may be accumulated in diesel particulate filter 10, thereby distorting differential pressure characteristics. Therefore, there is a limit in accurately calculating the soot collection quantity and the recycling time.

SOOT COLLECTION QUANTITY MEASURING DEVICE FOR DIESEL PARTICULATE FILTER

CROSS-REFERENCE TO RELATED APPLICATION

The present application claims priority to Korean Application Serial Number 10-2006-0074248, filed on Aug. 7, 2006, the disclosure of which is hereby incorporated by reference herein in its entirety.

BACKGROUND OF THE INVENTION (a) Field of the Invention

The present invention relates to a soot collection quantity measuring device for a diesel particulate filter. In particular, the present invention relates to a soot collection quantity measuring device for a diesel particulate filter that can improve the accuracy of a soot collection quantity so as to recycle a diesel particulate filter at a suitable time.

(b) Description of the Related Art

In general, diesel vehicles are provided with a diesel particulate filter which converts carbon monoxide (CO) and hydrocarbon (HC) in an exhaust gas into carbon dioxide ($CO_2$) and water ($H_2O$). The particulate materials, which include various particulate harmful materials (i.e., soot), are collected in a filter. The particulate materials are subsequently burned by operating an externally or internally provided recycling device.

However, if soot is excessively accumulated in the diesel particulate filter, the soot collection quantity measuring device for a diesel particulate filter may not work properly, thereby increasing back pressure, and lowering engine power and fuel efficiency.

Therefore, the present invention provides a soot collection quantity measuring device for a diesel particulate filter that can improve the calculation accuracy of a soot collection quantity so as to recycle a diesel particulate filter at a suitable time.

SUMMARY OF THE INVENTION

The present invention provides a soot collection quantity measuring device for a diesel particulate filter. In one embodiment of the invention, a soot collection quantity measuring device for a diesel particulate filter is provided that can accurately obtain a soot collection quantity in a device regardless of non-uniform soot collection distribution in a diesel particulate filter and distortion of a differential pressure characteristic due to accumulation of ashes. The soot collection quantity measuring device for a diesel particulate filter can also perform filter recycling at an optimum time, thereby extending the lifespan of the device, minimizing a back pressure loss, and improving engine power and fuel efficiency.

In another embodiment of the invention, a soot collection quantity measuring device for a diesel particulate filter is provided and includes: an anion charging unit that is provided in an exhaust pipe in front of the diesel particulate filter and has a plurality of conductor flat plates connected to a cathode of a direct-current high-voltage power supply; a capacitor that has an upper electrode plate and a lower electrode plate disposed at the back of the anion charging unit in parallel with and are in close proximity to each other and connected to an anode and the cathode of the direct-current high-voltage power supply, respectively; a frequency generator that is provided on an anode line of the direct-current high-voltage power supply and supplies a sine wave having a predetermined frequency to the capacitor; a resistive element that is provided between the frequency generator and the upper electrode plate of the capacitor and forms a RC low pass filter together with the capacitor; and an engine control unit that calculates a soot concentration from a map previously input according to a magnitude of an alternating-current voltage applied to the capacitor. The engine control unit calculates soot emissions per unit time from the calculated soot concentration and an exhaust flow at that time so as to store total soot emissions as the engine operation time lapses. When the total soot emission increases to a set value or more and the engine control unit determines that soot is excessively collected in a filter of the diesel particulate filter, a warning will be given by the device.

The engine control unit may calculate the soot concentration from the map previously input according to a ratio of an alternating-current voltage value to a voltage value of the frequency generator.

The soot collection quantity measuring device for a diesel particulate filter may further include: a resistive heater that is provided at an upper surface of the upper electrode plate as an anode of the capacitor; a variable current controller that controls a current amount to be supplied to the resistive heater; and a controller that transmits, to the variable current controller, a signal for adjusting the current amount to be supplied to the resistive heater according to a ratio of an alternating-current voltage value of the capacitor to a voltage value of the frequency generator. With this structure, soot collected in the upper electrode plate can be burned and removed.

The conductor flat plates of the anion charging unit are provided in parallel with the exhaust pipe at regular intervals, and stabilize an exhaust flow flowing into the upper/lower electrode plate or of the capacitor.

DETAILED DESCRIPTION OF THE INVENTION

Hereinafter, an embodiment of the invention will be described with reference to the accompanying drawings.

Figure 1:
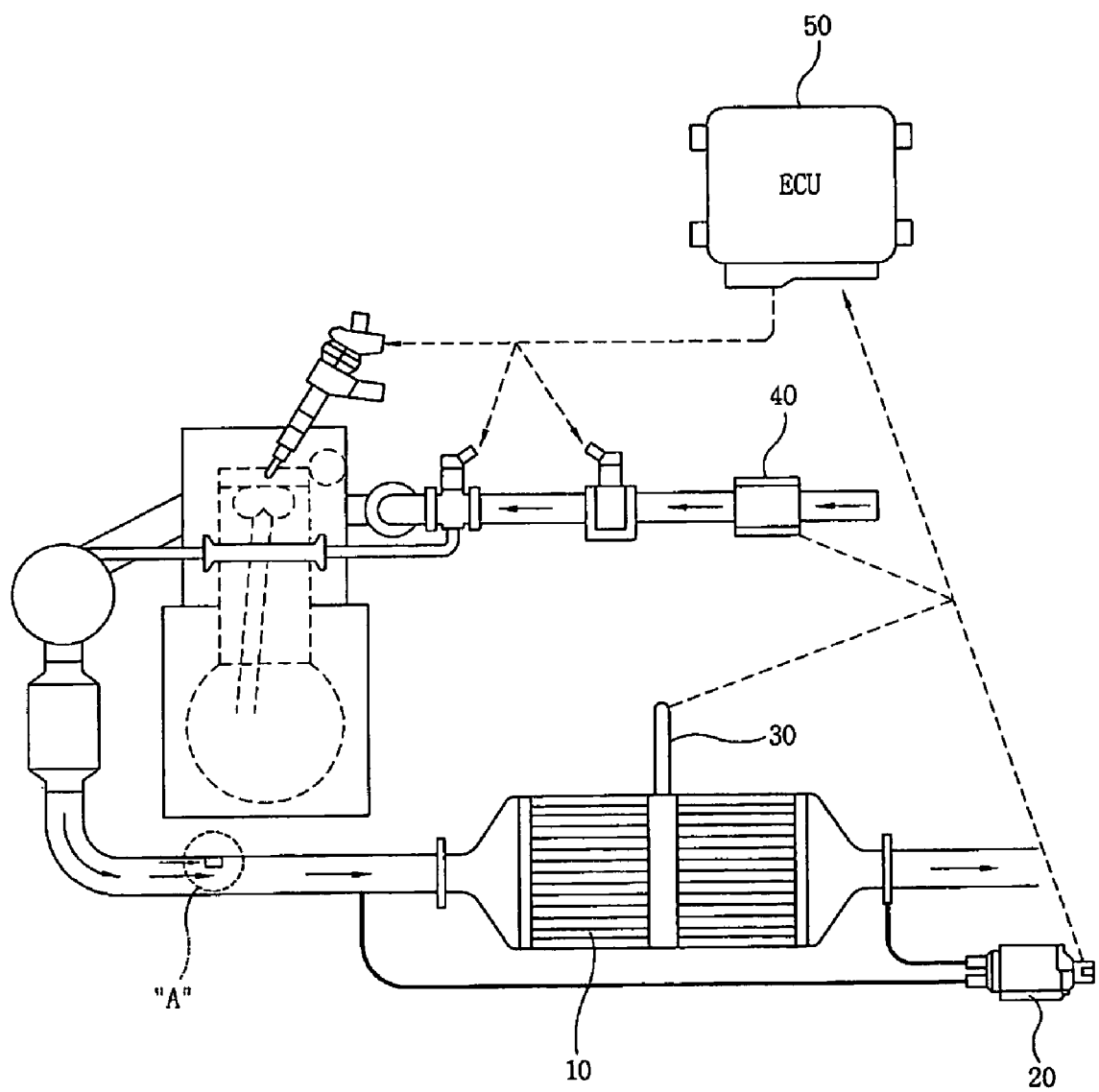
FIG. 1 is a structural view of an injection/exhaust line of a diesel engine that is provided with a diesel particulate filter.

Generally, in order to obtain the soot collection quantity as shown in FIG. 1, a differential pressure sensor 20 that detects a difference in pressure between an inlet and an outlet of diesel particulate filter 10, and a temperature sensor 30 that measures an exhaust temperature in the device are provided.

Accordingly, an exhaust mass flow is calculated from the sum of an injection flow measured by an air flow meter 40 and a fuel injection quantity to be controlled by an engine control unit 50. The exhaust volume flow is calculated from the exhaust temperature measured by the temperature sensor 30 and the exhaust mass flow. Subsequently, the soot quantity collected in the filter can be calculated from the differential pressure measured by differential pressure sensor 20 and the exhaust volume flow.

Next, when the soot collection quantity calculated in the above-described manner exceeds a predetermined amount, as described above, recycling of the diesel particulate filter is performed.

In the above-described method, soot collection distribution in diesel particulate filter 10 may be non-uniform, or an accurate differential pressure may not be measured due to a change in differential pressure characteristic of the device caused by excessive accumulation of ashes.

Accordingly, the accuracy of the soot collection quantity that is calculated using the differential pressure between the inlet and outlet of diesel particulate filter 10 may be lowered. Then, a filter recycling time may be erroneously determined, and an appropriate recycling time may be missed. As a result, the durability of the device deteriorates, and also a back pressure loss may increase.

Figure 2:
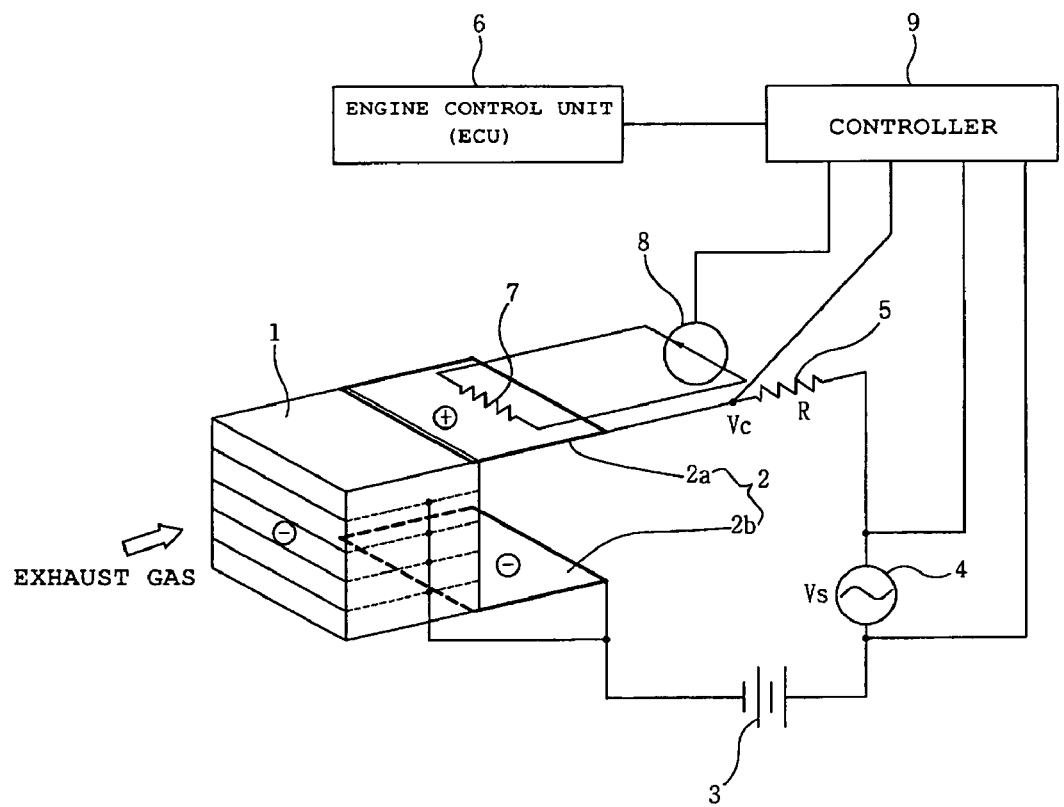
FIG. 2 is a structural view of a soot collection quantity measuring device according to an embodiment of the invention.

FIG. 2 is a structural view of a soot collection quantity measuring device according to an embodiment of the invention. A sensing unit senses soot concentration. In particular, an anion charging unit 1 and a capacitor 2 closely provided at the back of anion charging unit 1 are provided in an exhaust pipe in front of a diesel particulate filter 10 (portion A of FIG. 1) which senses soot concentration. At this time, they are preferably provided within a linear portion of the exhaust pipe such that it is advantageous to secure exhaust flow uniformity.

An anion charging unit 1 has a plurality of conductor flat plates that are disposed at regular intervals in a vertical direction and are in parallel with the exhaust pipe. Each of the conductor flat plates is connected to a cathode of a direct-current high-voltage power supply 3 outside the exhaust pipe. (A direct-current high voltage of between about 40,000 to about 70,000 V can be generated using an alternating-current power supply of between about 50 to about 60 Hz through a voltage regulator, a specific high-voltage transformer, a rectifier, and the like.)

An upper electrode plate 2a and a lower electrode plate 2b that are two metal conductor flat plates having low resistance are provided in parallel with each other on a downstream side of an exhaust flow direction of anion charging unit 1, (i.e., at the back of anion charging unit 1). Among them, the upper electrode plate 2a is connected to an anode of direct-current high-voltage power supply 3 and the lower electrode plate 2b is connected to the cathode. Upper electrode plate 2a and lower electrode plate 2b are provided in close proximity to each other so as to form capacitor 2 having an arbitrary capacitance C.

In a wiring line between the upper electrode plate 2a of capacitor 2 and the anode of direct-current high-voltage power supply 3, a frequency generator 4 that generates a sine wave having a predetermined frequency and supplies the sine wave to capacitor 2 is provided. Furthermore, a resistive element 5 having an arbitrary resistance R is provided to form a RC low pass filter together with capacitor 2. The frequency generator 4 is provided in close proximity to the anode of direct-current high-voltage power supply 3, and the resistive element 5 is provided close to upper electrode plate 2a of capacitor 2.

A voltage value $V_s$ of the sine wave generated by frequency generator 4 and a voltage value $V_c$ applied over both ends of capacitor 2 are inputs for the engine control unit 6.

The engine control unit 6 may simply calculate the soot concentration according to a magnitude of an alternating-current voltage applied to capacitor 2, or may calculate the soot concentration of an exhaust gas according to a ratio of the voltage value $V_c$ applied over both ends of capacitor 2 to the voltage value $V_s$ of frequency generator 4 (a comparative magnitude of the voltage of the capacitor to the voltage of the frequency generator). The engine control unit may comprise a processor, memory and associated hardware, software and/or firmware as may be selected and programmed by a person of ordinary skill in the art based on the teachings of the present invention.

In one soot concentration calculation method, data on the relationship between the capacitor voltage $V_c$ and the soot concentration are measured in advance through tests and are input to engine control unit 6. In another soot concentration calculation method, the relationship between the ratio of the capacitor voltage $V_c$ to the frequency generator voltage $V_s$ and the soot concentration are measured in advance through tests and are input to engine control unit 6.

If the soot concentration is calculated by the map previously input, the engine control unit 6 is programmed to calculate soot emissions per unit time from the calculated soot concentration and the exhaust flow, to accumulate and store total soot emissions as an engine operation time lapses. When the total soot emissions increase to a set value or more, the engine control unit determines that soot is excessively collected in a filter of the diesel particulate filter and recycling is required.

The exhaust flow may be calculated may be measured by an exhaust flow system that is directly provided at the back of the exhaust pipe.

Meanwhile, as described above, if the engine control unit 6 determines that filter recycling of the diesel particulate filter needs to be performed, the driver of the car is notified through an in-vehicle information unit (lamp flickering, alert sound generation, or the like). Furthermore, when an internal recycling device is provided, the engine control unit 6 can automatically operate the recycling device to burn and remove the soot collected in the filter.

Meanwhile, a resistive heater 7 is provided at an upper surface of upper electrode plate 2a of capacitor 2. In resistive heater 7, a heating element having a large resistance is attached to the upper surface of upper electrode plate 2a. Resistive heater 7 heats upper electrode plate 2a so as to burn and remove the soot collected at the lower surface thereof.

Resistive heater 7 is supplied with a current through a variable current controller 8. Variable current controller 8 is controlled by a signal from a controller 9 that is separately provided, and adjusts the amount of the current to be supplied to resistive heater 7.

In this case, the voltage value $V_s$ of frequency generator 4 and the voltage value $V_c$ applied over both ends of capacitor 2 is input to controller 9, not to engine control unit 6. Controller 9 is configured to adjust the amount of a current to be supplied with a variable current controller 8, which is inversely proportional to the ratio to the voltage value $V_c$ of the capacitor to the voltage value $V_s$ of the frequency generator. Controller 9 can also be configured to adjust the amount of a current to be supplied by changing the magnitude of the voltage value $V_c$ of the capacitor, and transmitting the input voltage values or a calculated value (a ratio between two voltages) to the engine control unit 6, such that engine control unit 6 can calculate the soot concentration.

The operations and effects of the invention will now be described.

When a diesel engine operates and an exhaust gas is emitted through the exhaust pipe, part of the exhaust gas passes between the conductor flat plates of the anion charging unit 1.

At this time, soot contained in the exhaust gas is negatively charged by the discharge reaction of the individual conductor flat plates that are connected to the high-voltage cathode.

The negatively charged soot passes between upper and lower electrode plates 2a and 2b that are provided at the back of the anion charging unit 1. At this time, soot particulates are affected by an electric field formed between upper and lower electrode plates 2a and 2b which are then moved and attached to upper electrode plate 2a connected to the anode.

Accordingly, since charges of upper electrode plate 2a decrease in proportion to the soot collection quantity, an effective electric field between upper and lower electrode plates 2a and 2b decreases, thereby also decreasing the capacitance of capacitor 2 decreases.

Capacitor 2, having an initial capacitance C, and resistive element 5 serve as a low pass filter with respect to an alternating-current signal of a sine wave input from frequency generator 4. As described above, if capacitance decreases, a cut-off frequency at both ends of capacitor 2 decreases according to the relational expression $f_c=2\pi*R*C$, and the decrease of the cut-off frequency $f_c$ accompanied by a decrease in alternating-current voltage of an output voltage $V_c$ to an input voltage $V_s$ having a frequency $f_s$.

Therefore, in an initial state when the soot is not collected, a ratio of $V_c$ to $V_s$ about 1, but, as the soot collection quantity increases, the ratio of $V_c$ to $V_s$ decreases. The engine control unit 6 calculates the soot concentration from the previously input map using the ratio of $V_c$ to $V_s$.

Next, as the engine operation time lapses according to a vehicle operation, the total soot emissions are accumulated and stored, and, when the total soot emissions increases to the set value or more, the engine control unit 6 determines that the soot is excessively collected in the filter of the diesel particulate filter and then recycling is required. Then, the engine control unit generates an alert message through a warning unit provided in the vehicle or operates the recycling device of the diesel particulate filter.

Therefore, before the soot is excessively collected in the filter of the diesel particulate filter, recycling can be performed.

Further, as described above, the engine control unit 6 may calculate the soot concentration simply according to the magnitude of the alternating-current voltage applied to capacitor 2.

Meanwhile, as described, as the soot collection quantity per unit time increases, the relative voltage magnitude of $V_c$ decreases. Accordingly, controller 9 adjusts the amount of the current to be supplied to resistive heater 7 such that it is inversely proportional to the magnitude of $V_c$. If the soot collection quantity becomes a predetermined amount or more, the upper electrode plate 2a is heated by a resistive heater 7 and the soot is collected at the lower surface is burned and removed.

Therefore, even though time lapses, the upper electrode plate 2a of capacitor 2 is repetitively recycled and it can be continuously used. Furthermore, an accurate soot concentration can be measured, and an appropriate recycling time of the diesel particulate filter can be determined from the measured soot concentration.

As described above, according to the embodiment of the invention, since the differential pressure relationship before and after the diesel particulate filter is not used to measure the soot collection quantity of the diesel particulate filter, the soot collection quantity can be more accurately calculated regardless of the distortion of a differential pressure characteristic according to the soot collection quantity and the accumulation of ashes, and thus the appropriate recycling time can be determined. In particular, since the ashes are not collected in the device according to the embodiment of the invention, there is no distortion of measurement of the soot collection quantity due to the ashes.

Therefore, since recycling of the diesel particulate filter can be performed at a suitable time, the diesel particulate filter can be prevented from being broken due to excessive accumulation of the soot. Furthermore, since recycling of the diesel particulate filter is performed at a suitable time, a back pressure loss by the diesel particulate filter is reduced, and thus engine power and fuel efficiency are improved.

Meanwhile, the sensing unit according to the embodiment of the invention can be reduced in size using the characteristic of the capacitor and has flat plates parallel to the exhaust flow. Therefore, the back pressure loss can be prevented from increasing due to the device according to the embodiment of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A soot collection quantity measuring device for a diesel particulate filter comprising:
    an anion charging unit that is provided in an exhaust pipe in front of a diesel particulate filter and has a plurality of conductor flat-plates connected to a cathode of a direct-current high-voltage power supply;
    a capacitor that has an upper electrode plate and a lower electrode plate disposed at the back of said anion charging unit in parallel with and close to each other and connected to an anode and the cathode of said direct-current high-voltage power supply, respectively;
    a frequency generator that is provided on an anode line of said direct-current high-voltage power supply and supplies a sine wave having a predetermined frequency to said capacitor;
    a resistive element that is provided between said frequency generator and the upper electrode plate of said capacitor and forms a RC low pass filter together with said capacitor; and
    an engine control unit that
        calculates a soot concentration from a map previously input according to a magnitude of an alternating-current voltage applied to said capacitor;
        calculates soot emissions per unit time from the calculated soot concentration and an exhaust flow at that time so as to store total soot emissions as an engine operation time lapses; and
        when the total soot emission increases to a set value or more, the engine control unit determines that soot is excessively collected in a filter of the diesel particulate filter and recycling is required, thereby operating a warning unit and a recycling device.

2. The device as defined in claim 1, wherein said engine control unit calculates the soot concentration from the map previously input according to a ratio of the alternating-current voltage value of said capacitor to a voltage value of said frequency generator.

3. The device as defined in claim 1, further comprising:
    a resistive heater that is provided at an upper surface of the upper electrode plate as an anode of said capacitor;
    a variable current controller that controls a current amount to be supplied to said resistive heater; and
    a controller that transmits, to said variable current controller, a signal for adjusting the current amount to be supplied to said resistive heater according to a ratio of the alternating-current voltage value of said capacitor to a voltage value of said frequency generator.

4. The device as defined in claim 1, wherein the conductor flat plates of said anion charging unit are provided in parallel with the exhaust pipe at regular intervals, and stabilize an exhaust flow flowing into the upper/lower electrode plate of said capacitor.

* * * * *